I. H. Palmer.
Harvester Rake.
No. 41,016 Patented Dec. 22, 1863.
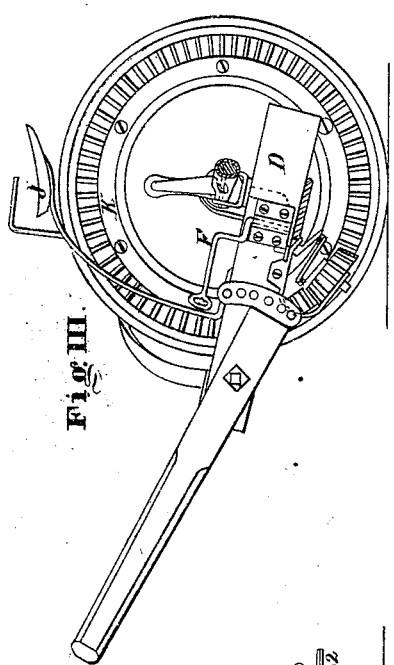
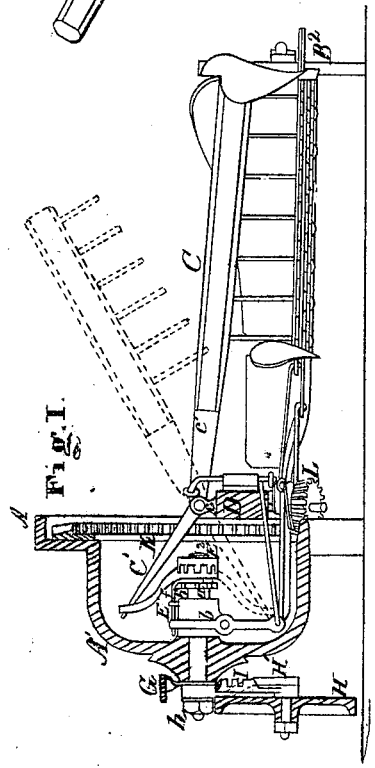
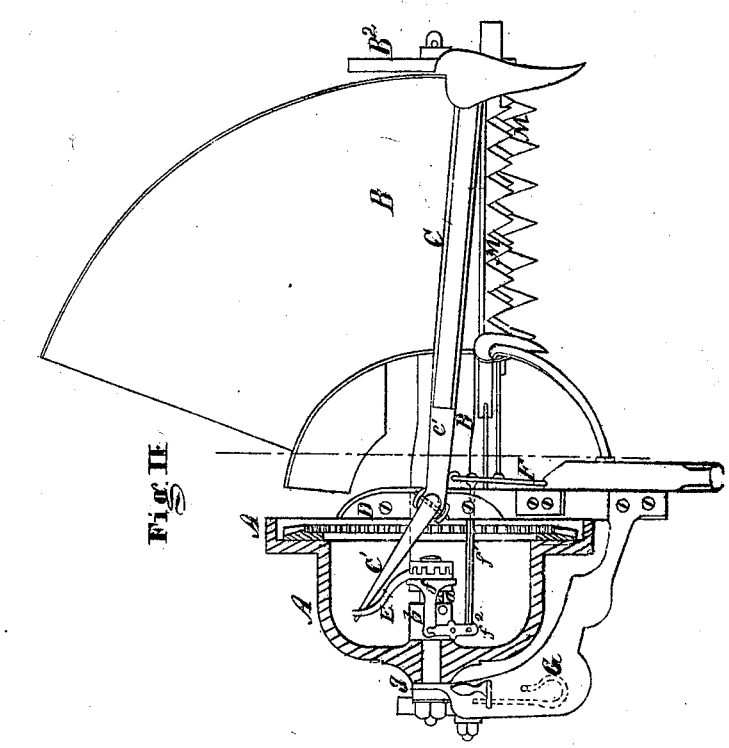
Witnesses
Charles Smith
Charles DuBois
I. H. Palmer
By Munn & Co
Attorneys

UNITED STATES PATENT OFFICE.

ISAAC H. PALMER, OF LODI, WISCONSIN.

IMPROVEMENT IN HARVESTERS.

Specification forming part of Letters Patent No. 41,016, dated December 22, 1863.

*To all whom it may concern:*

Be it known that I, ISAAC H. PALMER, of Lodi, in the county of Columbia and State of Wisconsin, have invented certain new and useful Improvements in Harvesters; and I do hereby declare the following to be a full and exact description of the same, reference being had to the accompanying drawings, making part of this specification, in which—

Figure 1 is a vertical transverse section of my improved harvester. Fig. 2 is a horizontal section of the same. Fig. 3 is a vertical longitudinal section of the same, taken in the line $x\, x$, Fig. 2. Fig. 4 is a detached sectional view of a portion of the rake-operating mechanism. Fig. 5 is a section taken in the line $y\, y$, Fig. 4.

Similar letters of reference indicate corresponding parts in the several views.

The principal object of this invention is to produce novel and simplified mechanism for operating the rake of a harvesting or reaping machine, whereby the rake may be thrown into or out of gear with the greatest facility, and is adapted to be removed without difficulty when the machine is to be employed as a mower for cutting grass and the like.

Another object is to adapt the machine to be controlled by the operator in such a manner that the cutting mechanism and platform may be readily elevated to avoid obstacles, thus obviating the necessity of changing the course of the machine.

The invention consists, first, in the employment, in connection with a swiveled rake, of a lever and crank working in combination with a clutch-pinion of peculiar construction, all operating within a large hollow hub formed on the driving-wheel of the machine, as will be explained; second, in the use of an adjustable wheel and balancing-platform, arranged and employed in the manner to be described.

In order that others skilled in the art to which my invention appertains may be enabled to fully understand and use the same, I will proceed to describe its construction and operation.

In the accompanying drawings, A may represent the driving-wheel, and A' a large hollow hub or extension formed thereon.

Within the hub A', and projecting from the center thereof, is a shaft, $a$, which is encircled at one end by a loose collar, $b$, upon the bar B, by which one side of the platform B' is supported, said platform being supported at its other side by a wheel, B².

C represents a rake mounted upon a post swiveled in the beam D by means of a bracket, $c$, said rake being pivoted in the bracket $c$, so as to admit of the requisite vertical movement. The end on which the rake C is swiveled is provided with a socket, $c'$, in the end of which is formed a suitable receptacle for a lever, C', which may be pivoted therein by the same pin which connects the socket $c'$ to the bracket $c$. The position of the lever C' is oblique with that of the rake, and at its end passes into the socket a sufficient distance to impart the necessary vertical movement to the rake when depressed. In order to cause the rake to sweep over the platform B, in a horizontal plane from front to rear, and be then elevated and returned to the front to repeat the movement, the end of the lever C' opposite that at which it is pivoted in the socket $c'$ is revolved by a crank, E, which is formed upon or rigidly attached to a sliding clutch-pinion, E', loosely fitted upon the shaft $a$. The clutch-pinion E' is moved back and forth upon the shaft $a$, so as to throw the rake into or out of gear, by a hand-crank, F, which moves a forked hand, $f$, through the medium of connecting-rods $f'\, f^2$, said hand fitting within a groove formed in the pinion E'. By the crank F the pinion E' may be interlocked with a pinion, E², rigidly secured upon the end of the shaft $a$, so as to cause the crank E to rotate therewith when it is desired to put the rake in operation; or, if it be desired to arrest the operation of the rake, the pinion E' may be disconnected from the pinion E² and moved back against the collar $b$, where it will be prevented from turning with the shaft $a$ by a pin, $b'$, on the collar $b$ passing into one of a series of holes, $e$, in the pinion E'.

G represents a platform resting at one end upon the beam D, and supported at the other end by the shaft $a$, which may project through the hub A for this purpose. The attachment of the platform G to the shaft $a$ is made by means of a collar, $g$, which fits loosely over the said shaft, so as to present no impediment to the rotation thereof, and said collar may constitute a washer interposed between the hub A' and a strong bent arm or axle, H, which is also loosely fitted upon the shaft $a$, and is secured thereon by a nut, $p$. This arm H' carries a wheel, H, which may be retained in position by means of a vertically-adjustable rack, I, which is adapted to work through a slot in the platform G. The dotted lines on the platform G in Fig. 2 represent a spring by which the rack I is constantly pressed inward, and the teeth thereof are caused to catch in the platform immediately after the elevation or lowering thereof. The respective functions of this platform and adjustable wheel will be presently explained.

J represents the operator's seat, erected upon the beam D and in convenient proximity with the platform G.

K is a cogged rim secured upon the inside of the wheel A, and operating a pinion, L, through the medium of which the cutter-bars M M are reciprocated in the ordinary manner.

The hub or extension A' is left whole to exclude straw and other matter from the mechanism contained within, and may serve to counterbalance the platform.

Operation: The parts being in position, it will be seen that as the team moves forward the rake is swept from front to rear in contact with the platform and returned to the front with no more than the requisite movement. By the oblique position of the lever C' and the manner of attaching it to the swiveled rake C the latter is so fully controlled that the use of any guides is unnecessary. When it is desired to arrest the operation of the rake the crank F is turned in the direction of the platform B', whereby the pinion E' will be retracted from the pinion E² and moved back against the collar b, where it will be held from turning by the pin b', as before explained. The holes e allow the pinion to catch at any point, and hence the rake may be arrested in any desirable position. The foot of the operator may be called into requisition for turning the crank F. Great delay is frequently incurred in using machines of this character by the driver being compelled to change the course of the machine for preventing contact of the cutter-bars with any injurious obstacle which may be presented. With my improved machine such obstacles may be avoided with comparatively little delay by the driver stepping upon the platform G, having first from his seat released the rack I, so as to permit the platform to descend. The driver's weight upon the platform G will then tilt the machine and elevate the grain-platform B' above the obstruction, the machine in the meanwhile running upon the wheels H and A.

It will be seen that the rake can be removed with great facility when it is desired to use the machine as a mower for cutting grass.

Having thus described my invention, what I claim as new, and desire to secure by Letters Patent, is—

1. The rake C, mounted upon a swivel-post secured to bar D, and operated by a lever, C', and crank E, arranged within the wheel A, in the manner described.

2. The clutch-pinion E' and detaining-pin b', arranged within the hub A of the wheel A', and employed, in combination with a rake, substantially as herein described, to retain it in its elevated position when out of gear.

3. In combination with a rake constructed and operating substantially as herein described, the large hollow hub A', projecting on one side of the driving-wheel to counterbalance the cutting apparatus and rake and exclude straw and other matters from the gearing, as explained.

4. The vertically-adjustable wheel H and balancing-platform G, when used in the described combination with the wheel A A' of a self-raking harvester, in the manner and for the purpose set forth.

ISAAC H. PALMER.

Witnesses:
CHARLES SMITH,
OCTAVIUS KNIGHT.